United States Patent [19]

Yokoshima

[11] Patent Number: 5,549,856
[45] Date of Patent: Aug. 27, 1996

[54] METHOD OF REPAIRING A PIPELINE WITH AN INJECTED RESIN

[75] Inventor: Yasuhiro Yokoshima, Ibaraki-ken, Japan

[73] Assignees: Shonan Gosei - Jushi Seisakusho K.K., Kanagawa-ken, Japan; Yokoshima & Company, Ibaraki-ken, Japan

[21] Appl. No.: 221,005

[22] Filed: Apr. 1, 1994

[30] Foreign Application Priority Data

Apr. 1, 1993 [JP] Japan ................................. 5-075907

[51] Int. Cl.⁶ .................................................. B29C 63/36
[52] U.S. Cl. ............................ 264/36; 138/97; 138/98; 156/94; 156/287; 156/294; 264/516; 264/269
[58] Field of Search ........................... 264/35, 36, 516, 264/269; 156/287, 294, 295, 94; 138/97, 98

[56] References Cited

U.S. PATENT DOCUMENTS

| | | | |
|---|---|---|---|
| 4,009,063 | 2/1977 | Wood | 264/269 |
| 4,135,958 | 1/1979 | Wood | 156/294 |
| 4,334,943 | 6/1982 | Zenbayashi et al. | 156/294 |
| 4,366,012 | 12/1982 | Wood | 156/287 |
| 4,602,974 | 7/1986 | Wood et al. | 264/516 |
| 5,348,764 | 9/1994 | Yokoshima | 156/287 |
| 5,384,086 | 1/1995 | Smith | 156/294 |

FOREIGN PATENT DOCUMENTS 60-242038  12/1985  Japan .

Primary Examiner—Mathieu D. Vargot
Attorney, Agent, or Firm—Lowe, Price, Leblanc & Becker

[57] ABSTRACT

A resin injection method and a pipeline repair method are provided for smoothly and rapidly performing setting of an open liner and for completing works such as eversion and insertion of the open liner even for a steeply inclined pipeline. An end portion of an open liner is everted such that the end is attached to one end of a pipe liner bag which has been introduced into a pipeline to be repaired. A resin is injected into the open liner from the other end thereof while the pipe liner bag is evacuated, thus injecting the resin into the pipe liner bag through the open liner. After the resin has been injected into the pipe liner bag 1 in the above-mentioned method, the open liner is everted by fluid pressure to be inserted into the pipe liner bag, whereby the resin is impregnated into the pipe liner bag. Then, the pipe liner bag is pressed against the inner wall of the pipeline 4, in which state the resin impregnated in the pipe liner bag is cured to repair the pipeline. This pipe repair method allows the pot life of the resin to be shortened, so that a work term required for the repair operations can be reduced.

5 Claims, 8 Drawing Sheets

METHOD OF REPAIRING A PIPELINE WITH AN INJECTED RESIN

BACKGROUND OF THE INVENTION

1. Field of the Invention

The present invention relates to pipe lining techniques, and more particularly to a method of injecting resin into a pipe liner bag which is used to repair pipelines. The present invention also relates to a method of repairing pipelines using such a pipe liner bag which is applicable to repairing pipelines which may be steeply inclined with respect to the horizontal direction.

2. Description of the Related Art

When an underground pipe, such a pipeline or passageway, becomes defective or too old to perform properly, the pipe is often repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent publication (Kokai) No. 60-242038.

According to the method described in the above-mentioned publication, the pipe repair method comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of procedure shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

When the pipe liner bag for use in the above-mentioned pipeline repair method is impregnated with a resin, a method as shown in FIGS. 12 and 13 is conventionally employed. More specifically, a vacuum hose 108, connected to a vacuum pump (not shown), is first inserted into a pipe liner bag 101 from an end thereof. Then, from the other end of the pipe liner bag 101, a resin 105 is directly injected into the pipe liner bag 101 through a resin injecting hose 112, and thereafter the pipe liner bag 101 is evacuated by the vacuum hose 108, while an open liner 102 is everted and inserted by fluid pressure into the pipe liner bag 101 as shown in FIG. 13, thus impregnating the resin 105 into the pipe liner bag 101.

However, if the above-mentioned conventional method is applied to a pipe liner bag for repairing a steeply inclined pipeline, a bent portion of the pipe liner bag 101 presents an acute angle, which causes the resin to stay inside the pipe liner bag 101, and makes it difficult to evert and insert the open liner 102.

Also, since the installation of the open liner 102 takes a long time, a pot life of the resin 105 must be set long, which requires a long time for hardening of the resin 105, thus resulting in a longer work term.

OBJECT AND SUMMARY OF THE INVENTION

In view of the above-mentioned problems, it is a first object of the present invention to provide a method of injecting a resin into a pipe liner bag which is capable of smoothly and rapidly performing setting of an open liner and completing works such as eversion and insertion of the open liner even for a steeply inclined pipeline. As a result, the pot life of a resin can be shortened to reduce a work term required for the repair operations.

It is a second object of the present invention to provide a pipeline repair method using the pipe liner bag impregnated with a resin according to the above injecting method.

To achieve the first object, the method of injecting a resin into a pipe liner bag, according to the present invention, comprises the steps of: (a) introducing a pipe liner bag into a pipeline to be repaired; (b) everting an end portion of an open liner such that the end portion is fixed to one end of the pipe liner bag; (c) injecting a resin into the open liner from the other end thereof while evacuating the pipe liner bag; and (d) injecting a predetermined amount of the resin into the pipe liner bag through the open liner.

Also, the method of repairing a pipeline, according to the present invention, comprises the steps of: (a) introducing a pipe liner bag into a pipeline to be repaired; (b) everting an end portion of an open liner such that the end portion is fixed to one end of the pipe liner bag; (c) injecting a predetermined amount of a resin into the open liner from the other end thereof while evacuating the pipe liner bag said evacuation being continued until no resin is left in the open liner; (d) everting the open liner by applying fluid pressure so that the open liner is inserted into the pipe liner bag to impregnate the resin into the pipe liner bag; (e) pressing the pipe liner bag against the inner wall of the pipeline; and (f) curing the resin impregnated in the pipe liner bag, with the pipe liner bag continuously pressed against the inner wall of the pipeline.

In accordance with the present invention, since the resin is injected by fluid pressure into the pipe liner bag through the open liner in a state where a portion of the open liner has previously been everted and inserted into an end portion of the pipe liner bag, the open liner can be smoothly and rapidly everted and inserted into the pipe liner bag, even if a pipeline is installed at a steep angle with respect to the horizontal direction. Thus, in addition to the smooth and rapid eversion and insertion of the open liner, the installation of necessary equipment can also be completed efficiently in a short time. As a result, the pot life of the resin can be set short to allow the resin to be cured in a shorter time, thereby reducing a work term required for the pipeline repair operations.

3

The above and other objects, advantages and features of the invention will appear more fully hereinafter in the following description given in connection with the accompanying drawings and the novelty thereof pointed out in the appended claims.

DESCRIPTION OF THE PREFERRED EMBODIMENTS

The present invention will hereinafter be described in conjunction with the preferred embodiments thereof with reference to the accompanying drawings.

Figure 1:
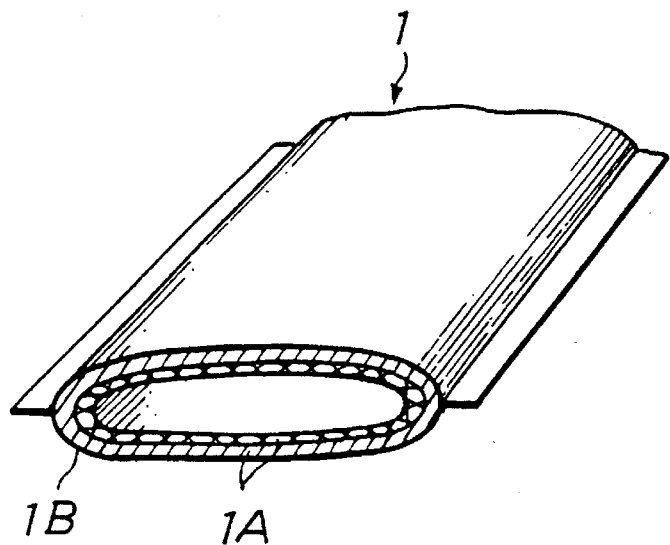
FIG. 1 is a perspective view showing part of a pipe liner bag used in the present invention.
Figure 2:
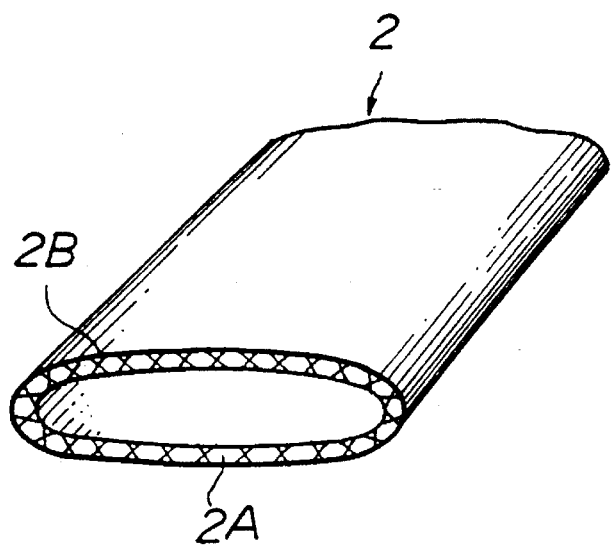
FIG. 2 is a perspective view showing part of an open liner used in the present invention.
Figure 3:
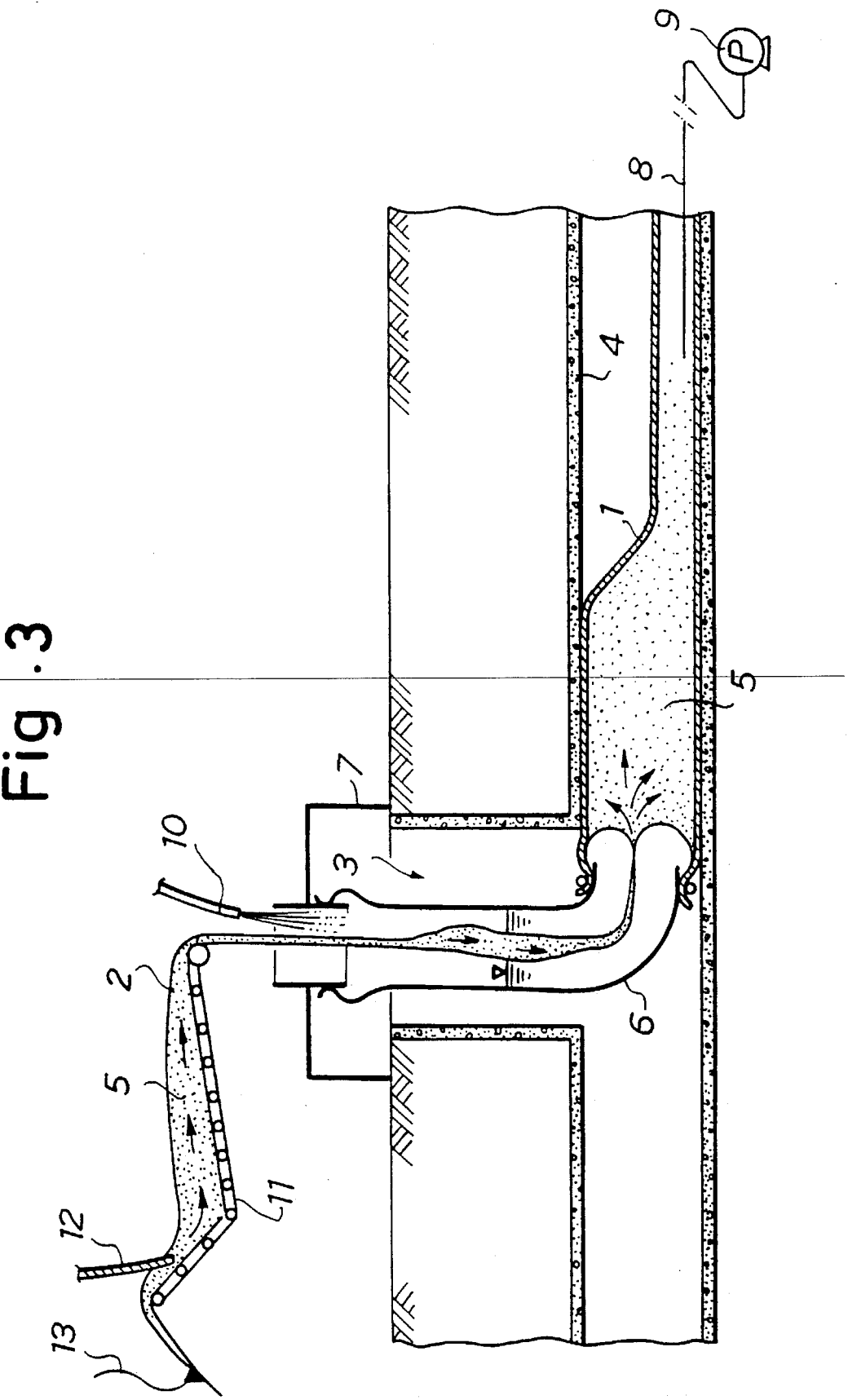
FIGS. 3–5 are cross-sectional views showing the processes of a resin injection method and a pipeline repair method according to the present invention.
Figure 4:
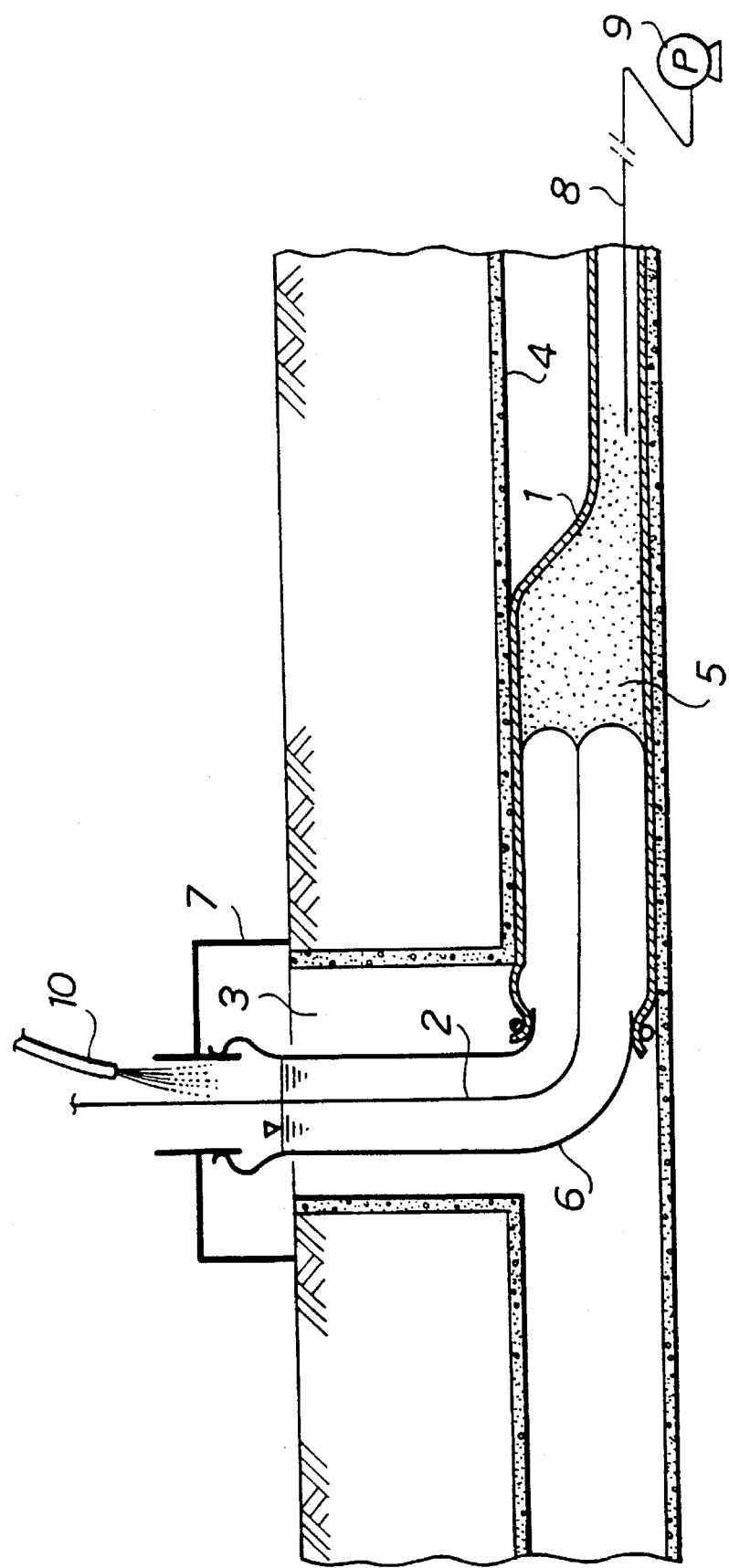
Figure 5:
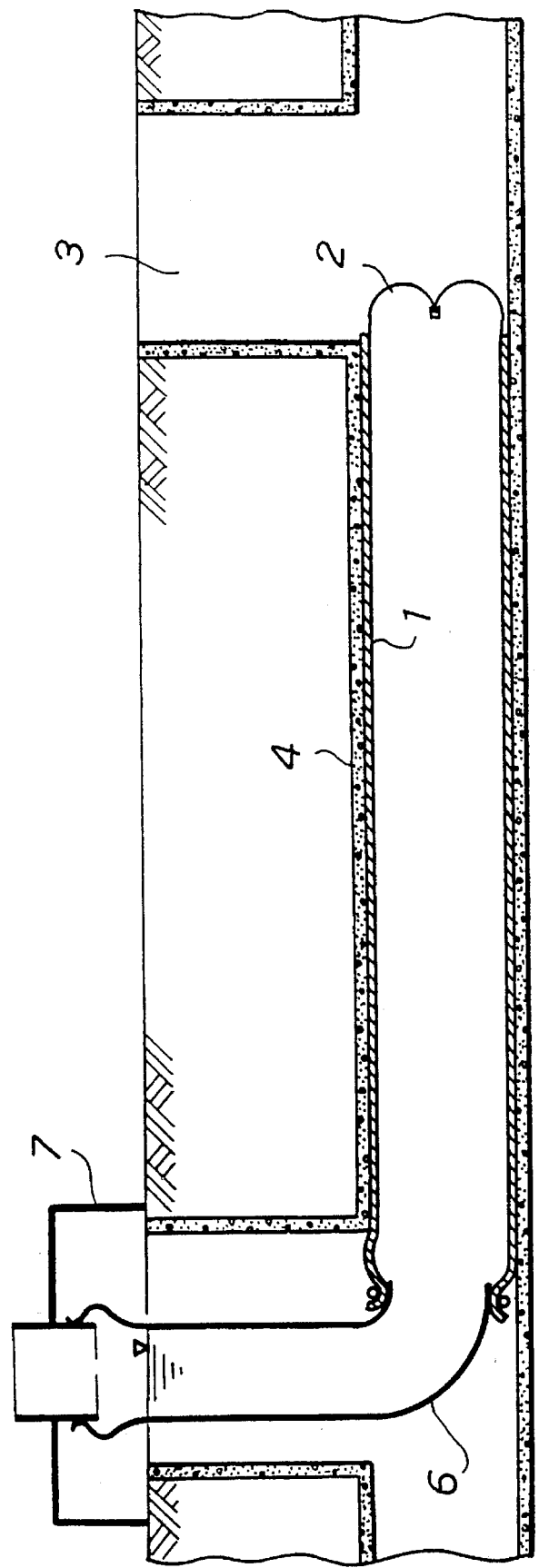

FIG. 1 shows part of a pipe liner bag 1 in perspective form; FIG. 2 shows part of an open liner in perspective form; and FIGS. 3–5 show in cross-section a resin injection method and a pipeline repair method according to the present invention in the order of their processes.

Specifically referring to FIG. 1, the pipe liner bag 1 used in the methods of the present invention has a structure comprising a double-tubular resin absorbent 1A made of unwoven fabric, which may be made of polyester, acrylic resin, nylon, polypropylene, or the like, and a tubular plastic film 1B coated over the outer peripheral surface of the resin absorbent 1A. The tubular plastic film 1B may be made of polyethylene, nylon-polyethylene copolymer, EVA, polypropylene or the like.

Referring now to FIG. 2, an open liner 2, likewise used in the methods of the present invention, is shown. The open liner 2 comprises a resin absorbent 2A made, for example, of unwoven fabric and a tubular plastic film 2B coated over the outer peripheral surface of the resin absorbent 2A.

Next, the resin injection method and the pipeline repair method according to the present invention will be explained with reference to FIGS. 3–5.

First, the pipe liner bag 1 is introduced into a pipeline 4 through a manhole 3, and then a resin 5 is injected into the pipe liner bag 1, as shown in FIG. 3. The resin 5 is assumed to be a thermosetting resin in this embodiment.

In a work for injecting the resin 5 into the pipe liner bag 1, a nozzle 6 having the tip bent substantially at the right angle is inserted into the manhole 3 and supported by a frame 7 such that the nozzle 6 is substantially perpendicularly installed with respect to a pipeline to be repaired. Then, the open liner 2 is inserted into the nozzle 6 and a portion of the open liner 2 near the leading end is everted such that the leading end of the open liner 2 is fixed to the periphery of the lower opening of the nozzle 6. Next, one end of the pipe liner bag 1 is also fixed to the periphery of the lower opening of the nozzle 6 over the open liner 2. Further, a vacuum hose 8, which is connected to a vacuum pump 9, is inserted into the pipe liner bag 1 from the other end side.

When a predetermined amount of water is injected into the nozzle 6 from a water supply hose 10, the open liner 2 is everted near the leading end fixed to the nozzle 6 and partially inserted into the pipe liner bag 1. With this state maintained unchanged, a hole is formed through the other end of the open liner 2 (the portion supported on a conveyer guide 11 on the ground) in order to insert a resin injecting hose 12 into the open liner therethrough. Then, a predetermined amount of resin 5 is injected through the resin injecting hose 12 into the open liner 2, while the vacuum pump 9 is driven to reduce the pressure inside the pipe liner bag 1 substantially to a vacuum level. After the predetermined amount of resin 5 has been injected into the open liner 2, the resin injecting hose 12 is removed from the open liner 2. The hole formed through the open liner 2 for the resin injecting hose 12 is closed by a thermal treatment or by an bonding agent.

The resin 5 injected into the open liner 2 is drawn by negative pressure prevailing in the pipe liner bag 1 to flow into an uneverted portion of the open liner 2 as indicated by the arrows in FIG. 3, and eventually flows into the pipe liner bag 1 from the open liner 2. In this event, if the open liner 2 itself is also evacuated by a vacuum hose 13 attached to the trailing end of the open liner 2 (an excessive portion of the open liner 2 which is not carried on the conveyer guide 11), the open liner 2 may also be impregnated with the resin 5.

Referring now to FIG. 4, when the predetermined amount of resin 5 has been injected into the pipe liner bag 1 in the manner described above, water is supplied into the nozzle 6 through the water supply hose 10. This results in everting the open liner 2 by the water pressure and successively inserting the same from the end to the inside of the pipe liner bag 1. This allows the open liner 2 to sequentially supply the resin 5 in the inserting direction thereof (to the right on FIG. 4). Simultaneously, the water pressure causes the open liner 2 to extend the pipe liner bag 1 to press the same against the inner wall surface of the pipeline 4. In this event, since the pipe liner bag 1 is being evacuated by the vacuum pump 9 through the vacuum hose 8, the resin 5 is gradually impregnated into the pipe liner bag 1 together with the eversion and insertion of the open liner 2 within the pipe liner bag 1.

Referring next to FIG. 5, when the open liner 2, which has been everted and inserted into the pipe liner bag 1, extends over the whole length of the pipeline 4, the pipe liner bag 1 is pressed against the inner wall surface of the pipe line 4 over the whole length thereof. With this state maintained, the resin 5 is cured. Specifically, since the resin 5 is thermosetting resin by way of example in this embodiment, heating of water inside the open liner 2 by vapor or the like will cause the resin 5 impregnated in the pipe liner bag 1 to be cured by heat conducted from the vapor. In this way, the inner wall of the defective or aged pipeline 4 is reinforced or repaired by the pipe liner bag 1. It should be noted that the resin 5 may be, for example, a photosetting resin which is cured by receiving light, as an alternative to the above-mentioned thermosetting resin.

In this embodiment described above, since the resin 5 is injected by water pressure into the pipe liner bag 1 through the open liner 2 in a state where a portion of the open liner 2 has previously been everted and inserted into an end portion of the pipe liner bag 1, the open liner 2 can be smoothly and rapidly everted and inserted into the pipe liner bag 1 in which the resin 5 has been injected, even if the pipeline 4 is installed at a steep angle. Thus, in addition to the smooth and rapid eversion and insertion of the open liner 2, the installation of necessary equipments can also be completed effectively in a short time. As a result, the pot life of the resin 5 can be shortened to allow the resin 5 to be cured in a shorter time, thereby reducing a work term for the pipeline repair operations. It should be noted that the setting of the pot life of the resin 5 at a short period also allows the resin 5 impregnated in the pipe liner bag 1 to be naturally cured by geothermy.

Figure 6:
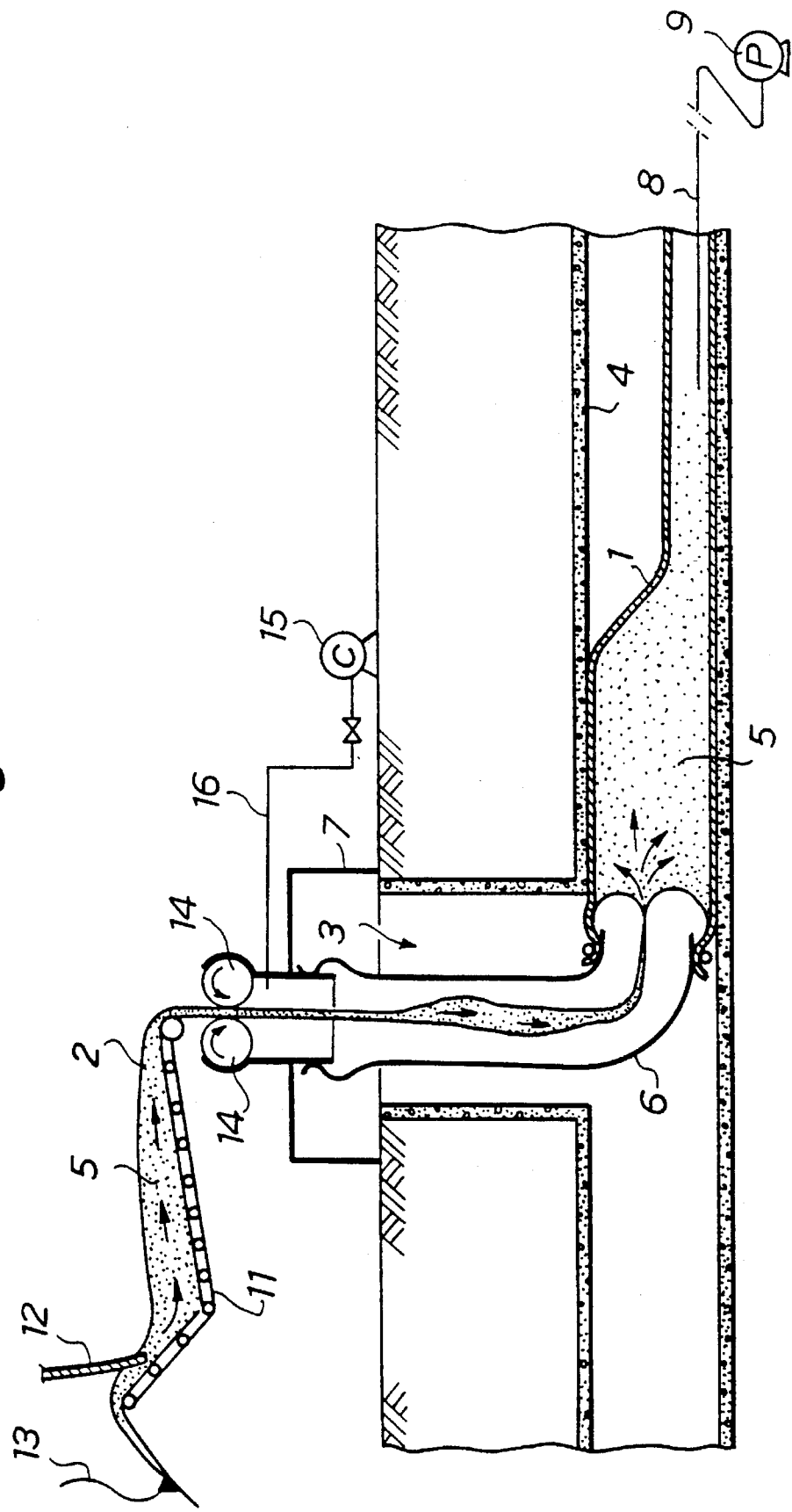
FIG. 6 is a cross-sectional view similar to FIG. 3 showing another embodiment of the present invention.

It will be understood that while water pressure is employed as fluid pressure for everting and inserting the open liner 2 in the foregoing embodiment, air pressure may also be used for the same purpose. Specifically, for example as shown in FIG. 6, a pair of balloon type rollers 14 are disposed on the top of the frame 7 such that they are rotated respectively in the directions indicated by the allows in the circles representing the rollers. The open liner 2 is passed between these rollers 14 to maintain the inside of the nozzle 6 in an air tight state. Then, an air compressor 15 is driven to supply compressed air into the nozzle 6 through an air hose 16 to cause the open liner 2 to be everted and inserted into the pipe liner bag 1 by the air pressure.

Figure 7:
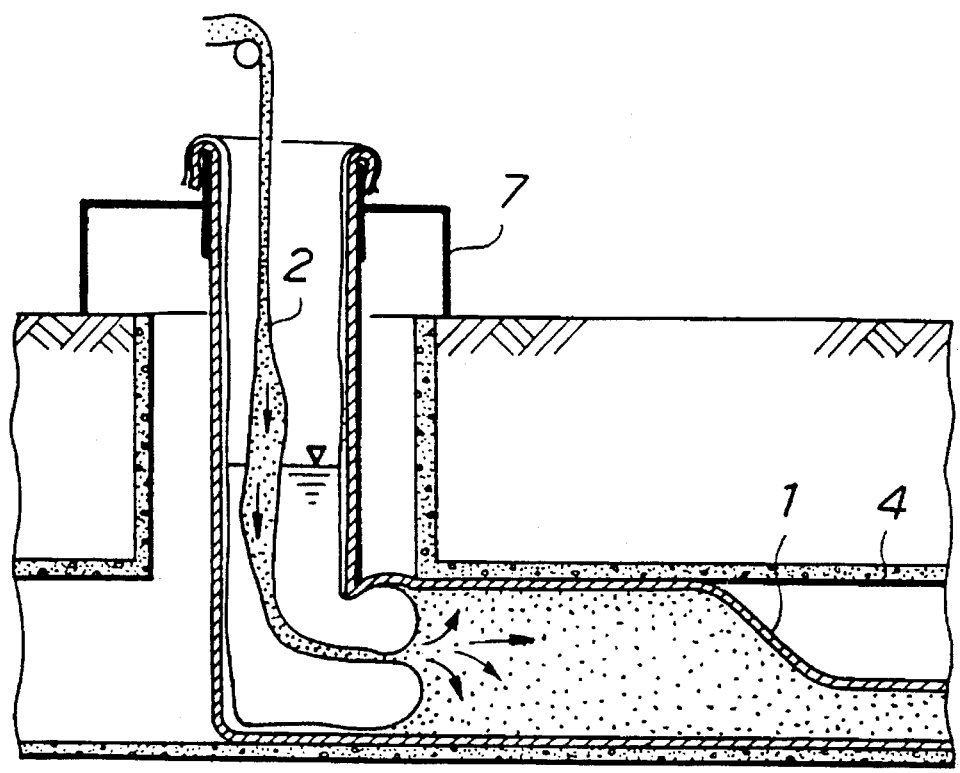
FIG. 7 is a cross-sectional view showing a further embodiment of the present invention.

Also, in an alternative embodiment shown in FIG. 7, the pipe liner bag 1 and the open liner 2 may be fixed to the frame 7 in such a manner that one end each thereof is directly fixed to the periphery of the opening of the frame 7 without using the nozzle 6.

Incidentally, although it is not particularly necessary to impregnate the resin 5 into the open liner 2, several methods of impregnating the resin 5 into the open liner 2 will be shown with reference to FIGS. 8–11.

Figure 8:
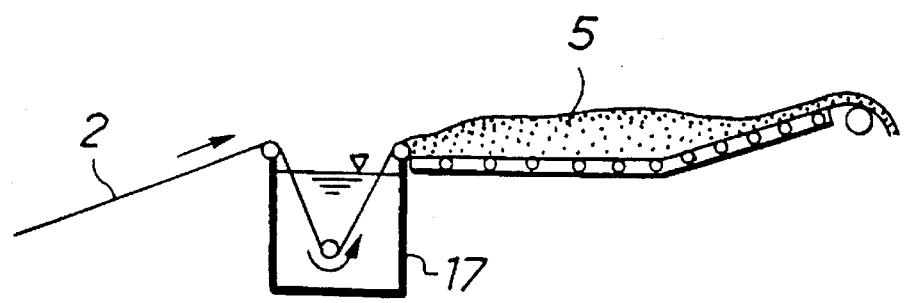
FIGS. 8 and 9 are cross-sectional views each showing a resin injection method according to the present invention.

First, in a method shown in FIG. 8, the open liner 2 is passed through water stored in a water container to apply the open liner 2 with water pressure which causes the resin 5 to be impregnated into the open liner 2 while extracting air from the inside of the open liner 2.

Figure 9:
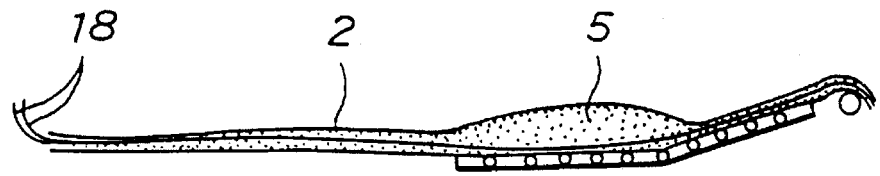

In a method shown in FIG. 9, a plurality of vacuum hoses 18 having different lengths from each other are provided inside the open liner 2. After the resin 5 is introduced into the open liner 2, these vacuum hoses 18 are opened at predetermined intervals, for example, every 15 meters in the longitudinal direction. Then, the respective vacuum hoses 18 are used to sequentially evacuate the inside of the open liner 2 in order to impregnate the resin 5 into the open liner 2.

Figure 10:
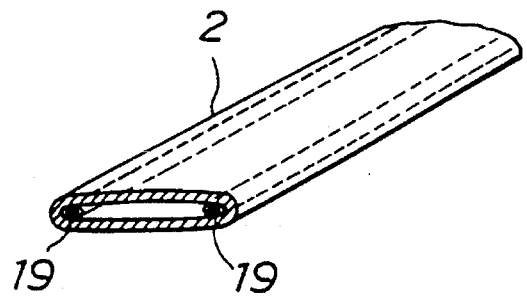
FIG. 10 is a perspective view of an open liner for explaining another resin injection method according to the present invention.
Figure 11:
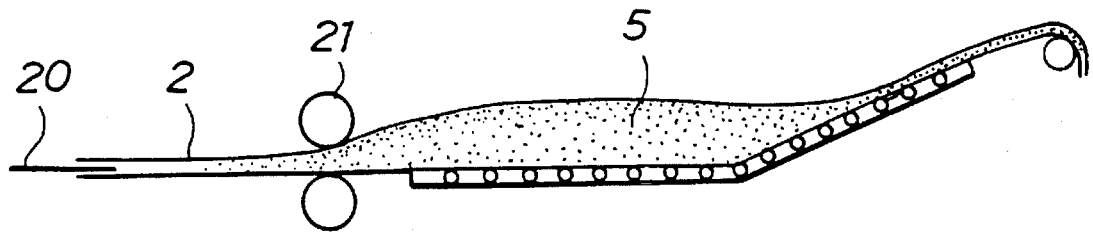
FIG. 11 is a cross-sectional view showing the resin injection method using the open liner of FIG. 10.
Figure 12:
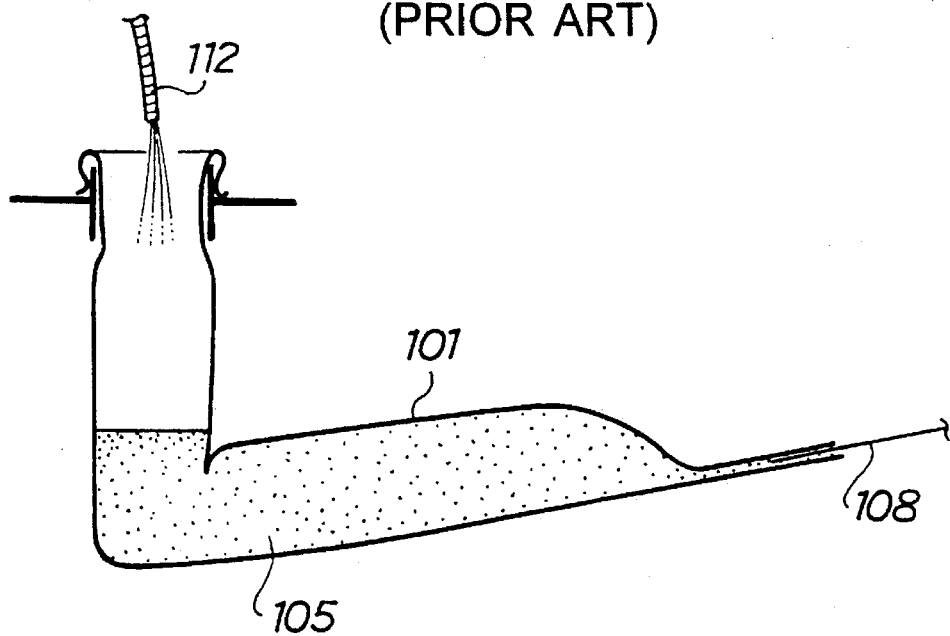
FIG. 12 is a cross-sectional view showing a conventional resin injection method.
Figure 13:
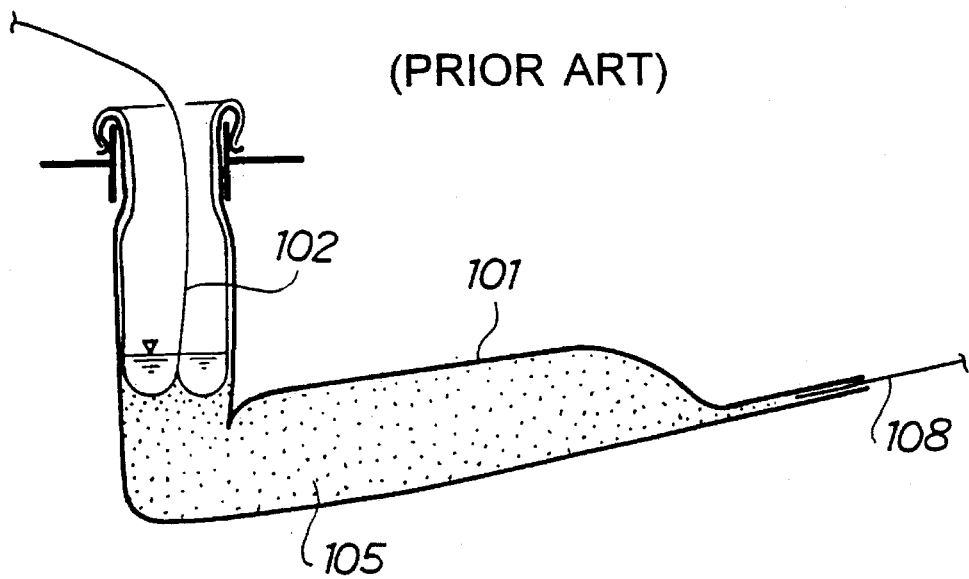
FIG. 13 is a cross-sectional view showing a conventional pipeline repair method.

In a method shown in FIGS. 10 and 11, air-permeable members 19 are disposed inside the open liner 2 as shown in FIG. 10, and the open liner 2 is evacuated by a vacuum hose 20 inserted from one end thereof to impregnate the resin 5 into the open liner 2, as shown in FIG. 11. A pair of rolls prevent the resin 5 from flowing to the air-permeable members 19.

As is apparent from the foregoing description, according to the present invention, since a resin is injected by fluid pressure into a pipe liner bag through an open liner in a state where a portion of the open liner has previously been everted and inserted into an end portion of the pipe liner bag, the open liner can be smoothly and rapidly everted and inserted into the pipe liner bag, even if a pipeline is installed at a steep angle with respect to the horizontal direction. Thus, in addition to the smooth and rapid eversion and insertion of the open liner, the installation of necessary equipments can also be completed efficiently in a short time. As a result, the pot life of the resin can be set short to allow the resin to be cured in a shorter time.

While the invention has been described in its preferred embodiments, it is to be understood that modifications will occur to those skilled in the art without departing from the spirit of the invention. The scope of the invention is therefore to be determined solely by the appended claims.

What is claimed is:

1. A method of repairing a pipeline, comprising the steps of:

(a) introducing a pipe liner bag into a pipeline to be repaired;

(b) everting an end portion of an open liner such that the end portion is fixed to one end of the pipe liner bag;

(c) injecting a predetermined amount of resin into the open liner from the other end thereof while evacuating the pipe liner bag, said evacuation being continued until no resin is left in the open liner;

(d) everting the open liner by applying fluid pressure so that the open liner is inserted into the pipe liner bag and to thereby impregnate the resin into the pipe liner bag;

(e) pressing the pipe liner bag against the inner wall of the pipeline; and (f) curing the resin impregnated in the pipe liner bag, with the pipe liner bag continuously pressed against the inner wall of the pipeline.

2. A method according to claim 1, wherein:

the fluid pressure step (d) is water pressure, and step (d) includes supplying a predetermined amount of water to the open liner.

3. A method according to claim 1, wherein:

step (e) includes applying water pressure into the pipe liner bag through the open liner, so that the pipe liner bag is pressed against the inner wall of the pipeline, and the water pressure is maintained during step (f).

4. A method according to claim 1, wherein:

the resin is a thermosetting resin, and step (f) includes applying heat to the pipe liner bag to cure the resin impregnated therein.

5. A method according to claim 1, wherein:

the fluid pressure in step (d) is air pressure, and step (d) includes supplying compressed air to the open liner.

* * * * *